United States Patent
Nagafusa et al.

(10) Patent No.: US 6,505,466 B1
(45) Date of Patent: Jan. 14, 2003

(54) ENGINE TEMPERATURE CONTROL SYSTEM

(75) Inventors: Makoto Nagafusa, Shizuoka (JP); Takashi Koike, Shizuoka (JP); Yoshihiro Gohara, Shizuoka (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 09/503,269

(22) Filed: Feb. 14, 2000

(30) Foreign Application Priority Data

Feb. 12, 1999 (JP) .......................................... 11-034929

(51) Int. Cl.$^7$ ............................................... F01N 3/00
(52) U.S. Cl. .................... 60/298; 60/320; 123/41.05; 123/41.15
(58) Field of Search ........................ 60/285, 298, 320; 123/41.05, 41.15; 440/88, 89

(56) References Cited

U.S. PATENT DOCUMENTS

| | | | |
|---|---|---|---|
| 3,996,793 A | * 12/1976 | Topper ...................... 73/117.1 |
| 4,459,951 A | 7/1984 | Tobinaga et al. |
| 4,562,801 A | 1/1986 | Koike |
| 4,630,036 A | * 12/1986 | Ford ...................... 123/41.05 |
| 4,695,822 A | 9/1987 | Furukawa |
| 4,708,669 A | 11/1987 | Kanno et al. |
| 4,790,279 A | 12/1988 | Tobinaga et al. |
| 4,951,624 A | 8/1990 | Hirano |
| 4,951,640 A | 8/1990 | Hirukawa et al. |
| 4,965,549 A | 10/1990 | Koike |
| 4,966,115 A | 10/1990 | Ito et al. |
| 5,309,882 A | 5/1994 | Hoshiba et al. |
| 5,531,191 A | * 7/1996 | Davis ...................... 123/41.15 |
| 5,562,509 A | * 10/1996 | Nakase et al. ................. 60/320 |
| 5,692,460 A | * 12/1997 | Froeschl et al. ......... 123/41.15 |
| 5,753,188 A | * 5/1998 | Shimoda et al. .............. 60/320 |
| 5,769,055 A | 6/1998 | Motose et al. |
| 5,797,775 A | 8/1998 | Ozawa et al. |
| 5,827,150 A | 10/1998 | Mukumoto |
| 5,857,324 A | * 1/1999 | Scappatura et al. ........... 60/320 |
| 5,873,330 A | * 2/1999 | Takahashi et al. ............. 60/320 |
| 5,884,243 A | * 3/1999 | Taniguchi et al. ....... 123/41.05 |
| 5,911,609 A | * 6/1999 | Fujimoto et al. ............. 60/276 |
| 5,970,951 A | 10/1999 | Ito |
| 6,068,528 A | * 5/2000 | Suzuki ........................ 440/89 |
| 6,151,891 A | * 11/2000 | Bennett ........................ 60/320 |

OTHER PUBLICATIONS

Ely, S., The Engineering of Plants to Express *Bacillus thuringienis* δ–Endotoxins, *Bacillus thuringienis*, An Environment Biopesticide: Theory and Practice, Edited by P.F. Entwistle et al., XP–002054693, pp. 105–124 (1993).

Donovan, W.P., et al., Characterization of Two Genes Encoding *Bacillus thuringienis* Insecticidal Crystal Proteins Toxic to Coleoptera Species, Applied and Environmental Microbiology, XP–000876861, pp. 3921–3927 (1992).

\* cited by examiner

*Primary Examiner*—Thomas Denion
*Assistant Examiner*—Diem Tran
(74) *Attorney, Agent, or Firm*—Knobbe, Martens, Olson & Bear, LLP (57) ABSTRACT

A control system for an engine or exhaust system includes a sensor that detects an exhaust gas temperature and a sensor that detects an exhaust coolant temperature. The sensors communicate with a controller. Based upon the output from the sensors, the controller determines whether each sensor is functioning properly and whether the cooling system is functioning properly. In the event of a malfunction of a sensor or the cooling system, an alarm is issued and the speed or operation of the engine is altered. In addition, if the controller detects a problem with the coolant system based upon coolant temperature or with the coolant temperature sensor, then the controller disables a starter motor such that the engine cannot be restarted without resetting the starter motor. The start motor can be disabled through a relay and the relay can be reset manually or automatically after a preset period of time.

35 Claims, 6 Drawing Sheets

ENGINE TEMPERATURE CONTROL SYSTEM

PRIORITY INFORMATION

This application is based on and claims priority to Japanese Patent Application No. 2000-236816, filed Aug. 4, 2000.

FIELD OF THE INVENTION

The present invention generally relates to engine control systems. More particularly, the present invention relates engine control systems arranged to detect and respond to engine overheat conditions.

BACKGROUND OF THE INVENTION

As is well known, engines powered by internal combustion engines that are mounted inboard of the hull and within an engine compartment generally require adequate cooling through a water cooling system. It is desirable to ensure that adequate cooling water can reach the engine and the associated exhaust system to reduce the temperature of these components. Due to the construction of most personal watercraft, which is discussed below, the exhaust cooling system often can fail or have reduced efficacy without the rider becoming aware of the condition until the engine seizes or the catalyst is damaged.

Personal watercraft are a relatively small type of watercraft wherein the rider sits more upon than in the watercraft. With this type of watercraft, the engine compartment is frequently formed below the rider's area or immediately forwardly of it. In addition, both the engine and the exhaust system associated with the engine are generally encased within the engine compartment.

To provide an indication of an operational state of the cooling system, a telltale line is often connected to the cooling system. The telltale line emits a constant trickle of water so long as water is flowing through the cooling system. If the water from the tell-tale line stops flowing, then the rider has a visual confirmation of a problem within the cooling system; however, such an indication often is not early enough to allow the operator time to return to port. In addition, the absence of the water trickle may not attract the attention of the operator until it is too late. Moreover, even should such an indication become apparent to the operator, the operator may not operate the engine at a slow enough speed to avoid damaging various engine and exhaust system components.

SUMMARY OF THE INVENTION

Accordingly, an engine temperature control system is desired that will positively alert the operator to a malfunction within the cooling system and that will act to reduce the temperature of the engine and exhaust system. For instance, once a high temperature operating condition is detected, the engine could be slowed through misfiring and eventually stalled to compensate for the malfunction. Importantly, the system should be able to detect if the sensors used to identify the malfunction are operational or not. In addition, the system should not allow an engine restart after the engine is stopped due to the high temperature condition until the operator positively recognizes that a problem exists. Therefore, it is desired to provide an improved engine temperature control system for a personal watercraft having one or all of these functions, aspects or advantages.

Accordingly, one aspect of the present invention involves an exhaust temperature control system for an engine having an exhaust system that is cooled by an exhaust cooling system. The control system comprises a coolant sensor that is adapted to sense an operational condition of the exhaust cooling system. A controller is electrically connected to the coolant temperature sensor and the controller receives an input signal from the coolant temperature sensor, which signal is indicative of an operating condition of the exhaust cooling system. The controller also is controllably connected to a switchable relay. The relay is adapted to interrupt a power supply to a starter motor with the controller interrupting the power supply to the starter motor when the input signal indicates a malfunction in the exhaust cooling system.

Another aspect of the present invention involves a method of alerting an operator of a water vehicle to a malfunction in an exhaust cooling system. The method comprises sensing a temperature of an exhaust system and comparing the sensed temperature to a preset temperature. The method also involves activating an alarm if the sensed temperature is less than the preset temperature.

A further aspect of the present invention involves a method of alerting an operator of a water vehicle to a malfunction in an exhaust cooling system. The method comprises sensing a coolant temperature of an exhaust cooling system before ignition of an engine, comparing the sensed temperature to a first preset temperature and activating an alarm if the sensed temperature is more than the first preset temperature.

BRIEF DESCRIPTION OF THE DRAWINGS

These and other features, aspects and advantages of the present invention now will be described with reference to the drawings of a preferred arrangement, which arrangement is intended to illustrate and not to limit the present invention, and in which drawings.

DETAILED DESCRIPTION OF A PREFERRED EMBODIMENT OF THE PRESENT INVENTION

The present invention generally relates to temperature control systems for engines and/or exhaust systems.

Preferably, the control system has the ability to recognize a failure of a sensor, as well as a failure of a cooling system that cools the engine and/or the exhaust system. The control system is described in conjunction with an engine powering a personal watercraft because this is an application for which the arrangement has particular utility. Those of ordinary skill in the relevant arts will readily appreciate that the arrangements described herein also may have utility in a wide variety of other settings.

Figure 1:
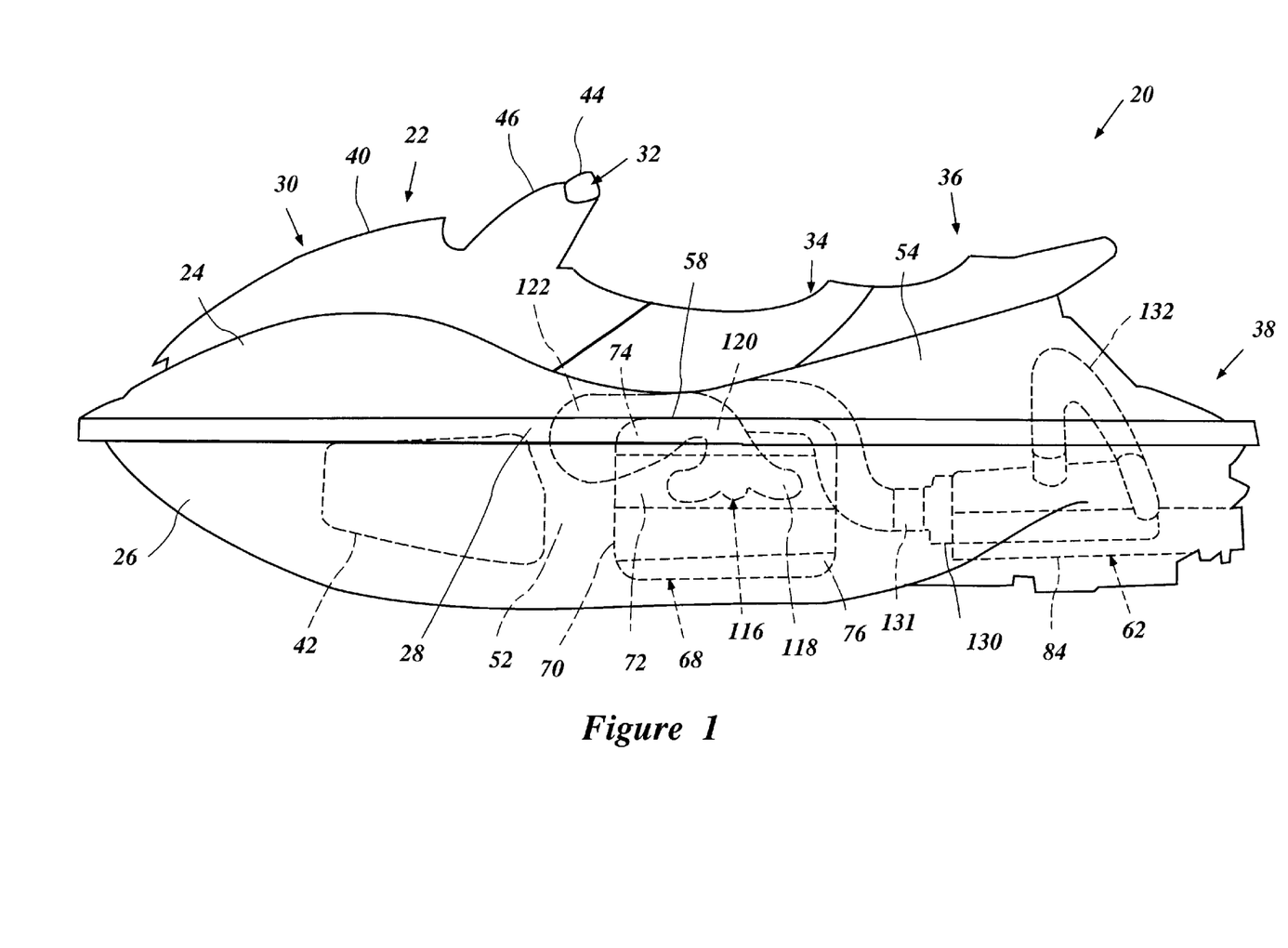
FIG. 1 is a side view of a personal watercraft having an engine temperature control system arranged in accordance with certain features, aspects and advantages of the present invention, with an engine, an exhaust system and certain other internal components illustrated in phantom.
Figure 2:
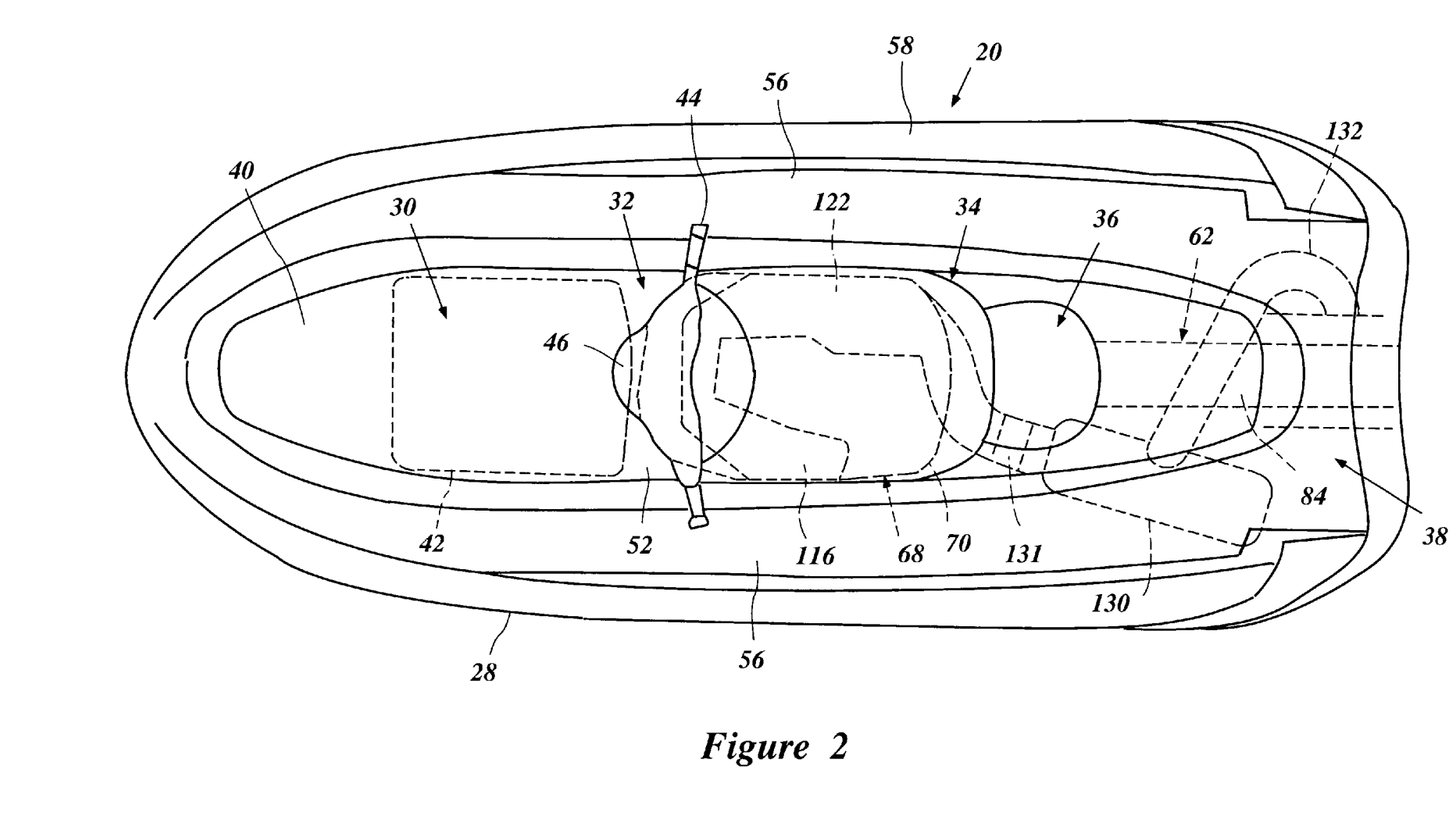
FIG. 2 is a top view of the watercraft illustrated in FIG. 1, with the engine, the exhaust system and certain other internal components illustrated in phantom.

With reference now to FIGS. 1 and 2, a personal watercraft, which is indicated generally by the reference numeral 20, is illustrated. The watercraft 20 includes a hull 22 that is defined by a top portion or deck 24 and a lower portion 26. The lower hull portion 26 and the upper deck 24 are joined around the peripheral edge at a bond flange 28. These portions of the hull 22 are preferably formed from a suitable material such as, for example, a molded fiberglass reinforced resin. For instance, the deck 24 can be formed using a sheet molding compound (SMC), i.e., a mixed mass of reinforced fiber and thermal setting resin, that is processed in a pressurized, closed mold.

As viewed in a direction from bow to stem, the upper deck portion 24 includes a bow portion 30, a control mast 32, a front seat 34, at least one rear seat 36 and a boarding platform 38. The bow portion 30 preferably slopes upwardly toward the control mast 32. A hatch cover 40 can be provided within the bow portion 30. The hatch cover 40 preferably is pivotably attached to the upper deck 24 and is capable of being selectively locked in a closed and substantially watertight position. The hatch cover 40 can cover a storage compartment or can cover a fuel tank 42, such as that illustrated in FIG. 1.

The control mast 32 extends upward from the bow portion 30 and supports a handlebar assembly 44. The handlebar assembly 44 controls the steering of the watercraft 20 in a conventional manner. The handlebar assembly 44 also carries a variety of the watercraft controls, such as, for example, a throttle control, a start switch and a lanyard switch. The handlebar assembly 44 is preferably enclosed by a handlebar cover 46 and desirably is mounted for rotational movement forward of the front seat 34.

The front seat 34 and the rear seats 36 desirably are of the straddle-type. A straddle-type seat is well known as a longitudinally extending seat configured such that operators and passengers sit on the seat with a leg positioned to either side of the seat. Thus, an operator and at least one passenger can sit in tandem on the seats 34, 36. Moreover, these seats 34, 36 preferably are centrally located between the sides of the hull 22. The front seat 34 preferably is positioned on a bottom plate (not shown) that covers an access opening (not shown), which allows access into a cavity or engine compartment 52 defined within the hull 22. Of course, the two seats 34, 36 can be combined in some arrangements into a single seat mounted to the watercraft by a single bottom plate or the like.

Figure 3:
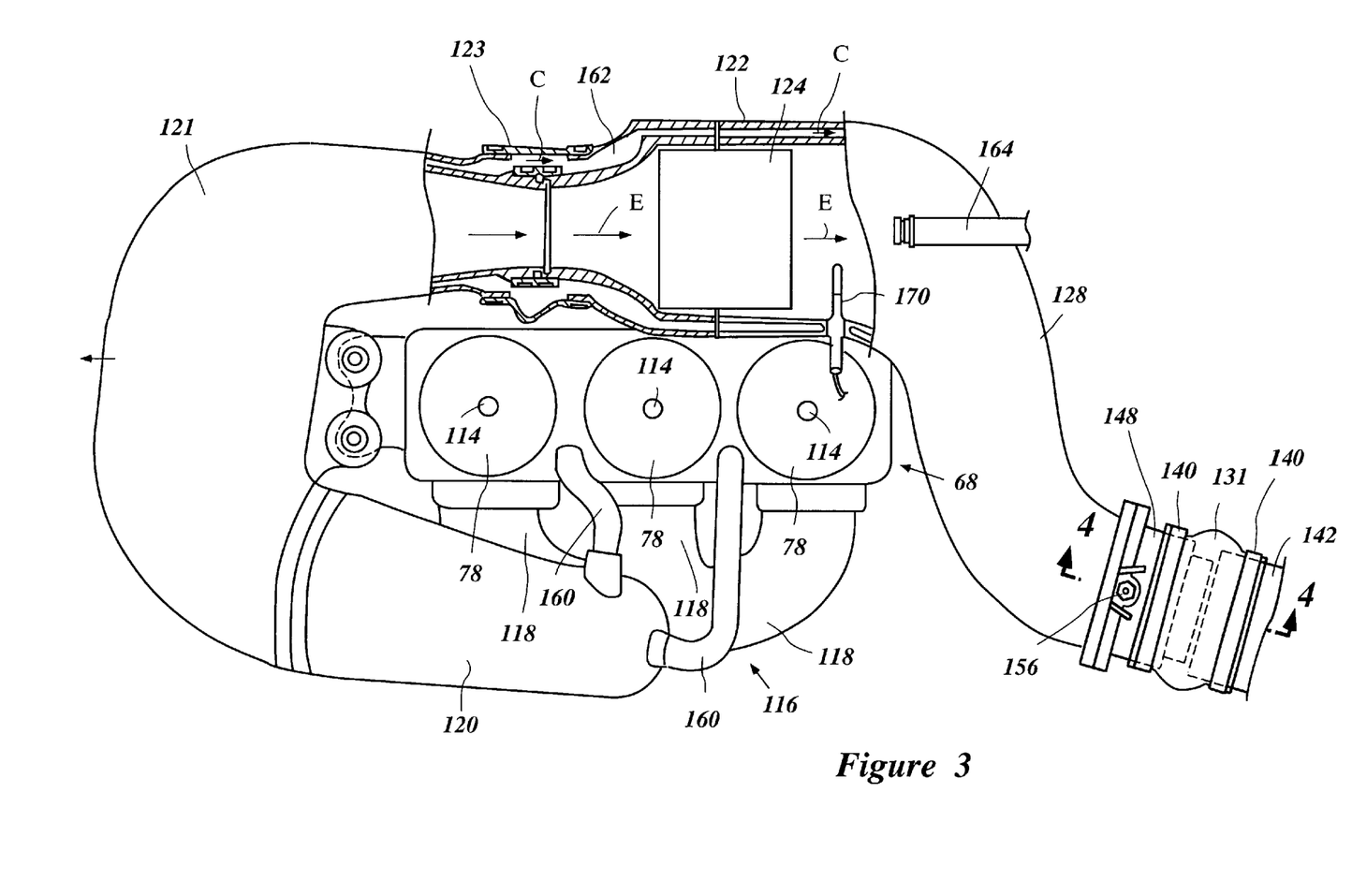
FIG. 3 is a partially sectioned top view of the engine and a portion of the exhaust system illustrating an exemplary positioning of an exhaust gas temperature sensor.

With continued reference to FIGS. 1 and 2, the upper deck 24 further comprises a longitudinally extending seat pedestal 54. The pedestal 54 supports the front seat 34 and the rear seat 36 in the illustrated arrangement. Foot areas 56 are formed alongside the pedestal 54 and generally are defined as the lower, generally horizontal area located between the pedestal 54 and a pair of raised side gunwales or bulwarks 58 that extend along the outer sides of the watercraft 20. As best illustrated in FIG. 3, the foot areas 56 preferably are sized and configured to accommodate the lower legs and feet of the riders who straddle the seats 34, 36. As described above, the illustrated watercraft 20 also includes the boarding platform 38, which is connected to the illustrated foot areas 56 and that is formed at the rear of the watercraft 20 behind the pedestal 54. The boarding platform 38 allows ease of entry onto the watercraft 20.

An in-line, three cylinder, two-cycle engine 68 is mounted within the engine compartment 52 of the illustrated watercraft 20 using resilient mounts as is well known to those of ordinary skill in the art. While the illustrated engine 68 is of the two-cycle variety, the engine 68 also can be of the four-cycle or rotary variety as well. Moreover, the engine 68 can have one, two or more than three cylinders and can be inclined, or formed with two banks of cylinders.

The general construction of a two-cycle engine is well known to those of ordinary skill in the art. With reference to FIGS. 1 through 3, the illustrated engine 68 generally comprises a cylinder block 70, a cylinder head 72, a cylinder head cover 74 and a crankcase 76. A set of cylinders 78 (see FIG. 3) is formed within the cylinder block 70. The cylinders 78 are capped by the cylinder head 72 and the cylinder head cover 74. A piston (not shown) is reciprocally mounted within each of the cylinders 78 and a combustion chamber (not shown) is defined within the cylinder 78 by the top of the piston (not shown), the wall of the cylinder and a recess (not shown) formed within a lower surface (not shown) of the cylinder head 72.

The crankcase 76 is attached to the opposite end of the cylinder block 70 from the cylinder head 72. A crankcase chamber (not shown) generally is defined by the crankcase 76 and the cylinder block 70. The crankcase chamber (not shown) preferably is subdivided by webs (not shown) or walls into separate chambers (not shown) corresponding to each of the cylinders 78. A crankshaft (not shown) is positioned within the crankcase (not shown) and is connected to the pistons (not shown) through a set of connecting rods (not shown). As the pistons (not shown) reciprocate within the cylinders 78, the crankshaft (not shown) is rotated within the crankcase chamber (not shown).

While not illustrated in FIGS. 1 through 3, the crankshaft (not shown) preferably is in driving relation with a jet propulsion unit 84 that is provided in a pump chamber 62. Specifically, the jet propulsion unit 84 preferably includes an impeller shaft (not shown) to which a propeller or an impeller (not shown) is attached. The crankshaft and the impeller shaft desirably are connected through a conventional shock-absorbing coupling. The impeller shaft extends in the longitudinal direction and extends through a propulsion duct that has a water inlet port positioned on a lower surface of the hull 22. The lower portion 26 of the hull 22 also includes an opening near the stem of the watercraft in which a jet outlet port of the propulsion unit 84 is positioned. The propulsion unit 84 generates the propulsive force by applying pressure to water drawn up from the water inlet port by rotating the impeller shaft and by forcing the pressurized water through the jet outlet port in a manner well known to those of ordinary skill in the art.

While not illustrated, the engine 68 also includes an induction system that provides air to each combustion chamber for combustion. The induction system can be configured in any suitable manner and may provide either an air charge (i.e., for direct injection engines or for engines having fuel injected into scavenge passages) or a mixed air-fuel charge (i.e., for indirect injection engines or carbureted engines). Further description of the induction system is not necessary to enable those of ordinary skill in the art to make and use the present invention.

A suitable ignition system also is provided for igniting the air and fuel mixture in each combustion chamber (not shown). Preferably, this system comprises a spark plug 114 corresponding to each cylinder 78. The spark plugs 114 are preferably fired by a suitable ignition system as well known to those of skill in the art. The ignition system preferably incorporates a capacitor discharge ignition control (CDI).

Exhaust gas generated by the engine 68 is routed from the engine 68 to a point external to the watercraft 20 by an exhaust system which includes an exhaust passage (not shown) leading from each combustion chamber (not shown) through the cylinder block. An exhaust manifold 116 or pipe is connected to a side of the engine 68.

The manifold 116 has a set of branches 118 each having a passage that corresponds to one of the exhaust passages leading from the combustion chambers (not shown). The branches 118 of the manifold 116 merge at a merge pipe portion 120 of the manifold 116, which extends in a generally forward direction. The merge pipe portion 120 has a further passage through which the exhaust is routed.

A c-shaped pipe 121 is connected to the exhaust manifold 116 and turns the exhaust flow toward the rear of the watercraft 20. The c-shaped pipe preferably is connected to the exhaust manifold 116 via a flanged connection.

An expansion pipe 122 is connected to the c-shaped pipe 121, preferably via a flexible member 123, such as a rubber sleeve. The sleeve allows relative expansion and contraction between the members as well as isolates the expansion pipe 122 from engine vibrations.

The expansion pipe 122 has an enlarged passage or chamber through which exhaust flows from the passage in the exhaust manifold 116. As illustrated, the expansion pipe 122 extends from its connection to the c-shaped pipe 121 near the front end of the engine 68 along the opposite side of the engine 68 from the exhaust manifold 116. A middle section of the expansion pipe 122 extends along the side of the engine 68 towards its rear end.

A catalyst 124 preferably is positioned within the expansion pipe 122. Moreover, a sound deadening protective cover (not shown) preferably encases a portion of the expansion pipe to reduce noise. The cover also can be designed to be thermally insulating such that the exhaust components that have reached an elevated temperature are not readily accessed through the access opening.

After flowing through the expansion pipe 122, the exhaust flows into an upper exhaust pipe section or stinger 128 of the exhaust system. This portion of the exhaust system leads to a water lock 130. The upper exhaust pipe 128 preferably is connected to the water lock 130 via a flexible fitting 131, such as a rubber sleeve. The exhaust flows through the water lock 130, which is preferably arranged in a manner well known to those of ordinary skill in the art to prevent the backflow of water through the exhaust system to the engine 68. The exhaust then passes to a lower exhaust pipe 132, which has its terminus in the water near the stem of the watercraft 20. In this manner, exhaust flows from the engine 68 through the exhaust system to its discharge within the water. Of course, other discharge arrangements also can be used.

Figure 4:
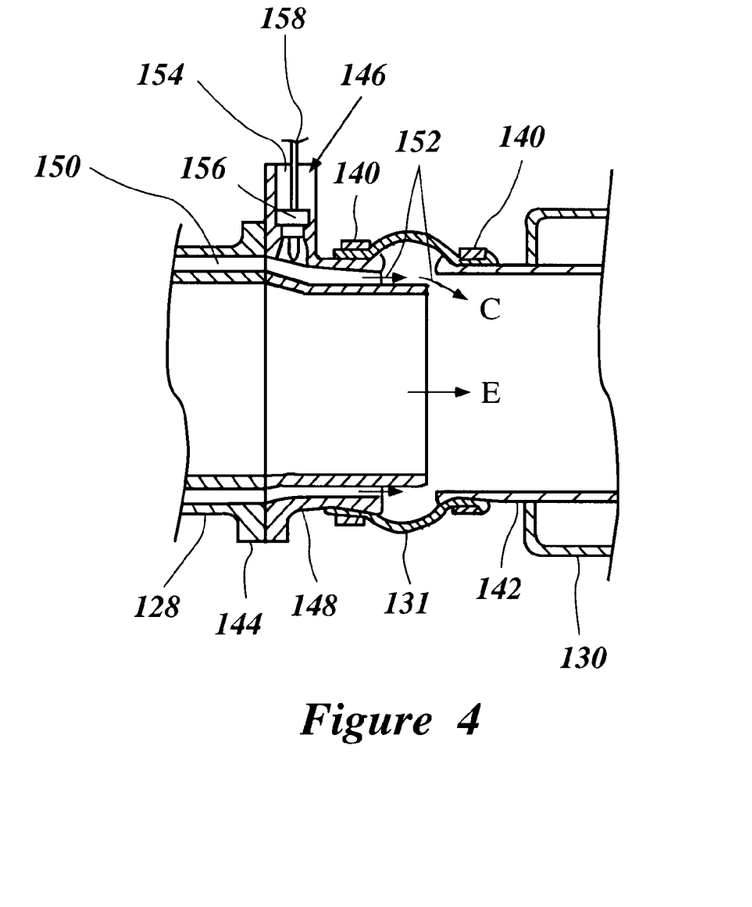
FIG. 4 is a sectioned view of another portion of the exhaust system illustrating an exemplary exhaust pipe temperature sensor.

With reference now to FIGS. 3 and 4, a coupling arrangement between the stinger 128 and the waterlock 130 will be described in more detail. Specifically, as shown, a pair of hose clamps 140 are positioned about the ends of the sleeve 131. The hose clamps 140 thereby secure the sleeve 131 over the ends of both the stinger 128 and an inlet pipe 142 that extends into the waterlock 130.

As best illustrated in FIG. 4, the downstream end of the stinger 128 includes a flange 144 that is coupled to a flange 146 of an extension pipe 148. The two flanges 144, 146 may be connected together in any suitable manner and desirably are formed such that a coolant passage 150, which will be described below, is in fluid communication with a coolant passage 152 extending through at least a portion of the extension pipe 148.

The flange 146 of the extension pipe 148 also carries a recess 154 in which a sensor 156 can be secured. The sensor 156 preferably is a coolant temperature sensor and can be of any suitable construction. For instance, in some arrangements, the sensor 156 may detect the presence of or absence of coolant flowing through the coolant passages 150, 152. The sensor can extend into the coolant passage, be positioned alongside the coolant passage or be connected external to the pipe. In other arrangements, the exhaust pipe temperature sensor is adapted to transmit either via a data-line 158 or using infrared signals, for instance, signals reflecting the temperature of the coolant flowing through the exhaust coolant passages 150, 152. Preferably, the sensor 156 registers an absolute value of the temperature 158 rather than a change in temperature. However, in some arrangements, it is anticipated that the sensor 156 may output a difference value that reflects a change in temperature over time.

With reference again to FIG. 3, the engine 68 also includes a cooling system. The cooling system generally comprises cooling jackets that extend through at least a portion of the engine, including the cylinder block and the cylinder head, and the exhaust system. As illustrated in FIG. 3, coolant transfer pipes 160 carry coolant between the cylinder head and the exhaust system. Desirably, the exhaust system comprises a double-walled configuration such that a cooling jacket is defined between an inner wall and an outer wall formed in each of the pipes or sections of pipe constituting the exhaust system.

As illustrated in the upper portion of FIG. 3, exhaust flows through the center lumen (i.e., within the inner wall) of the exhaust pipes while coolant, indicated by the reference letter c, flows through the annular defined between the outer wall and the inner wall. More specifically, the coolant flows through a coolant passage 162 until the coolant passage merges with the exhaust passage, as best shown in FIG. 4.

A portion of the coolant is drained from the cooling jacket 162 at a location downstream of the catalyst 124 through a branch pipe 164. The branch pipe 164 desirably communicates with a telltale outlet port or other similar structure that allows a portion of the coolant to trickle across an outer surface of the watercraft thereby providing a visual confirmation that the coolant system is operational. In some applications, this branch pipe 164 may be used to supply an upwardly directed spray of water to increase the visibility of the watercraft during operation.

With reference now to FIG. 3, the control system also comprises an exhaust gas temperature sensor 170. Preferably, this temperature sensor 170 is positioned in the exhaust system downstream of the catalyst and reflects a temperature of gases within the exhaust system. As is known, the catalyst has a preferred range of operating temperatures, and the sensor is used in a control routine, which will be described below, to help maintain the temperature of the catalyst within its preferred range. Similar to the sensor 156 described above, while the temperature sensor 170 can output an absolute temperature indicative of the temperature being sensed within the exhaust flow, the sensor 170 also can be used to output a signal indicative of a difference or a change in temperature over time. Moreover, with reference to FIG. 3, the illustrated sensor 170 is positioned within the expansion chamber 122 and extends through the water jacket 162 into the exhaust flow. However, the sensor also may be mounted in any suitable arrangement and using any suitable method known to those of ordinary skill in the art.

Figure 5:
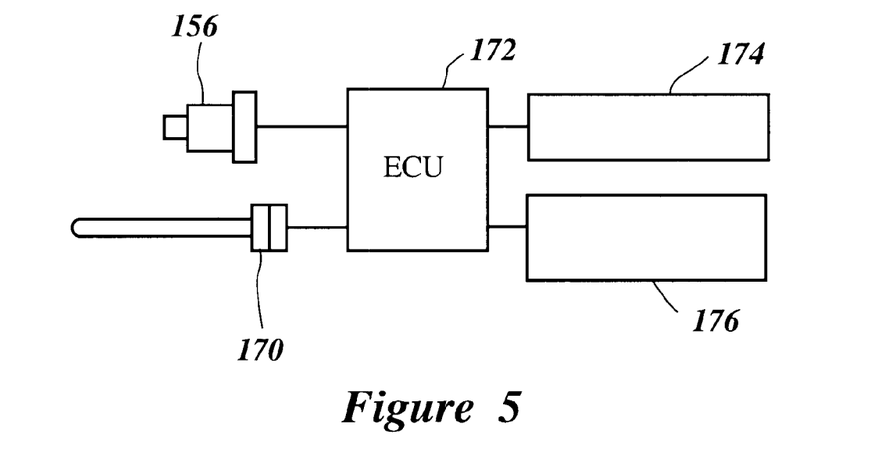
FIG. 5 is a schematic illustration of an engine temperature control system having certain features, aspects and advantages in accordance with the present invention.

With reference now to FIG. 5, a schematic diagram of an engine temperature control system having features, aspects and advantages in accordance with the present invention is illustrated. The control system generally comprises the exhaust pipe temperature sensor 156 and the exhaust gas temperature sensor 170. These two components output signals that are received by a control unit 172. The signals may be transmitted through data lines, such as cables or wires, or alternatively may be transmitted through the use of infrared signals as is generally known to those of ordinary skill in the art. The controller 172 may be logic circuitry, a solid state microprocessor, or any other suitable controller construction known to those of ordinary skill in the art.

The controller 172 outputs a signal to a display unit 174 and to an ignition control unit 176. The display unit 174 may include lamps or other indicia of operating conditions, such as gauges, bar graphs, warning lamps, and the like. In addition, the output may be provided to buzzers, alarms, bells, or other audible and/or tactile alerting devices. The output to the ignition control system 176 is typically used to control the firing of the spark plugs used to combust the air fuel mixture within the combustion chamber. As will be described, this output can be used to either advance or delay the ignition timing or to interrupt the firing of one or more cylinders to slow or stop the engine of the watercraft. Advantageously, the output from the controller 172 can represent either an overheat condition or a disabled sensor condition. Thus, the engine, the ignition control system 176 and the display unit 174 may be used to warn an operator of either condition.

Figure 6A:
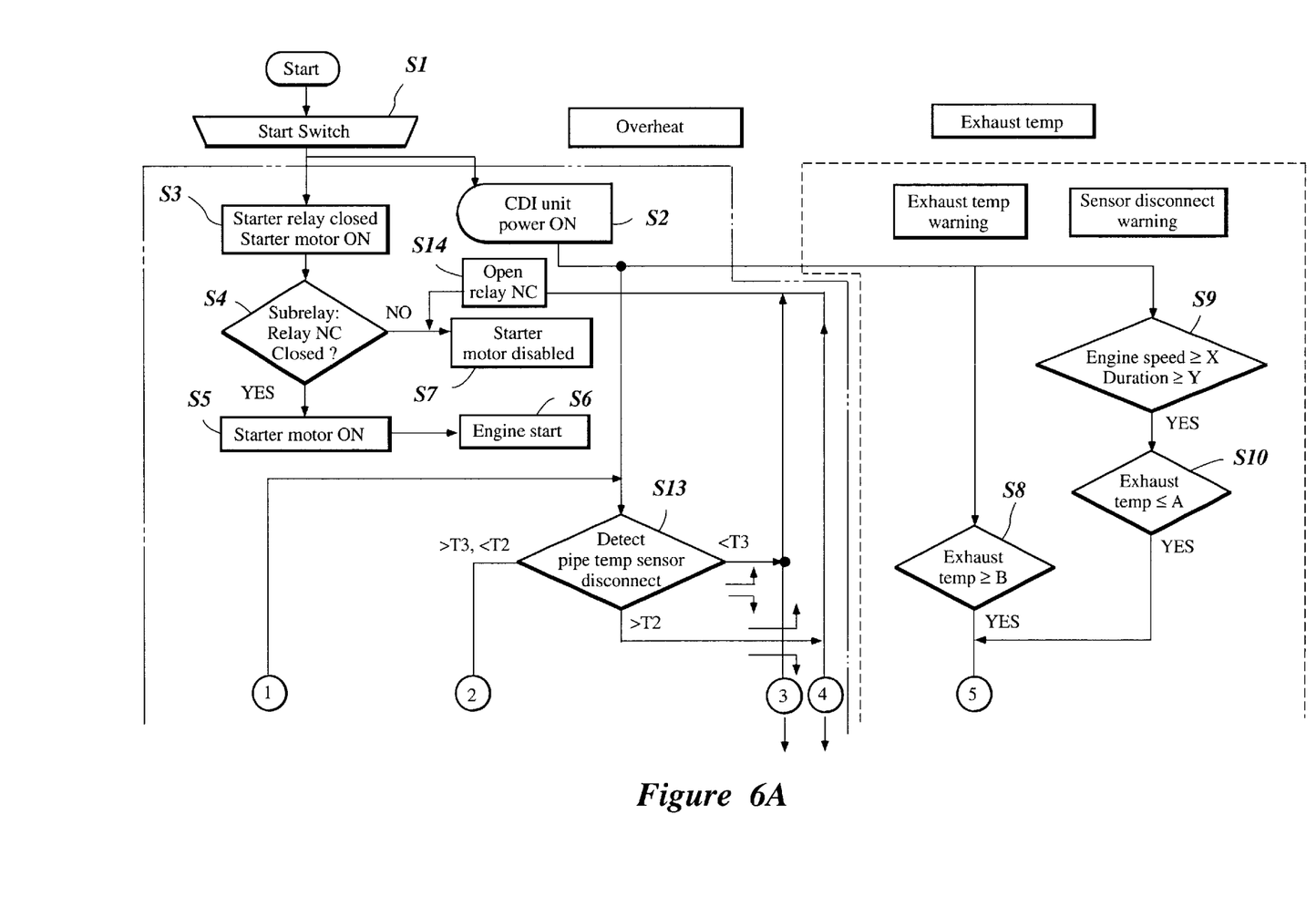
FIGS. 6A and 6B are an exemplary flow diagram of a control routine having certain features, aspects and advantages in accordance with the present invention, with the flow diagram being separated into two portions and with circles 1A, 2A, 3A, 4A and 5A being matched to respective circles 1B, 2B, 3B, 4B and 5B for connecting the two portions together.
Figure 6B:
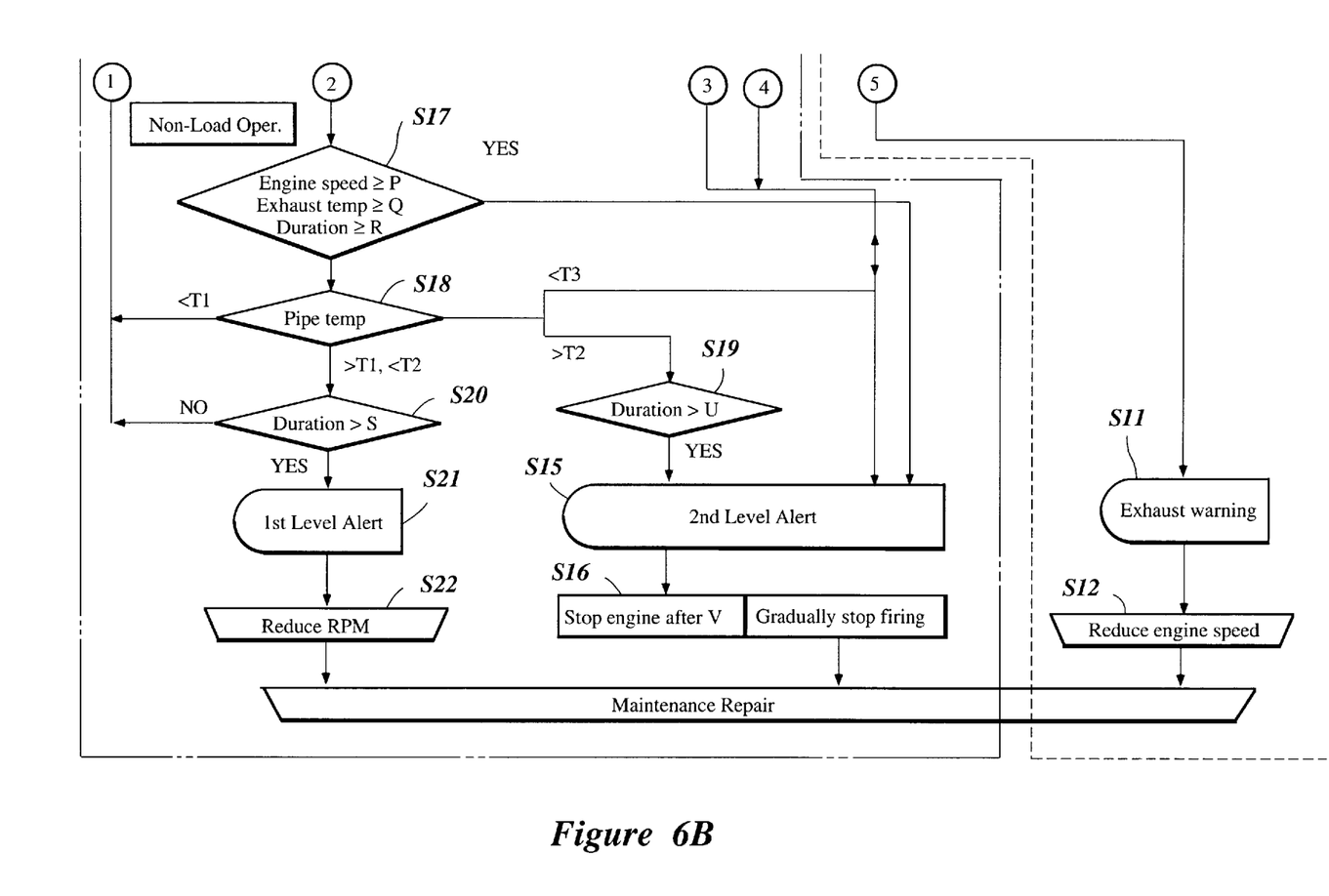

With reference now to FIGS. 6A and 6B, an exemplary control strategy for use in the engine control system is illustrated therein. While the illustrated arrangement features several steps or actions, the steps or actions may be rearranged and combined or separated in manners that will be recognized by those of ordinary skill in the art; however, the following is a description of one presently preferred arrangement of such a control system.

The control routine begins as a start switch is activated (see Step S1). As is known, the starter switch typically is used to activate a starter motor, which powers the engine for initial ignition. The start switch can be key activated, switch activated, or push button activated. In one presently preferred arrangement, the switch is push button activated.

Once the start switch has been closed, the CDI unit is powered by a power source, such as a battery, for instance. In addition, the starter motor relay is closed to provide electrical energy to the starter motor. Thus, the starter motor can be operated to start the engine (see Steps S2, S3).

As the starter motor is being actuated, the controller 172 determines whether a subrelay contact is closed. The sub-relay contact, as will be described below, generally is connected to a reset button, and is opened if a malfunction is discovered. The sub-relay is checked by the controller 172 and a signal is output depending upon whether the sub-relay is closed or not (see Decision Block S4). If the sub-relay is closed, indicating that the subrelay has been reset or that a malfunction has not recently occurred, then the starter motor is allowed to operate and the engine starts (see Steps S5, S6). In the event the sub-relay is not closed and, thus, the starter motor circuit is open, the starter motor cannot be powered to start the engine (see Step S7). Such a configuration is desired for reasons that will become apparent.

While the engine is operating, the controller 172 will continue to search for overheat conditions based upon either exhaust pipe temperature or exhaust gas temperature. Two separate subroutines are employed by the controller 172 to determine whether cooling system malfunction has occurred. One of these sub-routines checks the exhaust gas temperature while the other checks the exhaust pipe temperature.

The exhaust gas temperature subroutine will be described first. With continued reference to FIG. 6A, the exhaust gas temperature warning and sensor disconnect warning features will be described. As illustrated, after the CDI unit powers up, the controller 172 begins sampling output from the exhaust gas temperature sensor 170. In addition, the controller 172 also samples the engine speed and begins counting or timing functions in manners that will be described.

To detect whether there is reason for initiating an exhaust gas temperature warning, the controller 172 determines whether the exhaust gas temperature has exceeded a preset temperature B (see Decision Block S8). In some instances, this temperature is approximately 950° C. Of course, other values can also be used, depending upon the application. Unless the exhaust gas temperature sensed by the exhaust gas temperature sensor 170 exceeds the preset temperature B, no further action is required.

Simultaneous with or sequentially to the monitoring of the exhaust gas temperature, a sensor disconnect warning is also initiated. The exhaust gas sensor disconnect warning alerts the operator if the exhaust gas temperature sensor 170 has been disabled, disconnected, or otherwise is malfunctioning. Accordingly, the controller monitors both the engine speed and the time during which the engine operates above a preset speed (see Decision Block 59). For instance, in one application, the controller waits until the engine speed exceeds approximately 4,000 rpm for a period of over two minutes.

Once the engine has reached a preset operating speed for a preset period, the controller 172 samples the exhaust gas temperature through the exhaust gas temperature sensor 170. For instance, the output of the exhaust gas temperature sensor 170 indicates that the exhaust gas temperature is less than a preset temperature A, the sensor is malfunctioning (see Decision Block 510). Specifically, operating the engine at 4,000 rpm for greater than two minutes should increase the temperature of the exhaust gases within the exhaust system to greater than about 350° C., or another preset value dependent upon the application. If the sensed temperature is below the preset temperature A, then the routine continues on. Otherwise, the routine continues to cycle and the controller 172 continues to monitor the output of exhaust gas temperature sensor (Step S10).

With reference now to FIG. 6B, upon a determination of either an excessive exhaust gas temperature (S-8) or a malfunction with the exhaust gas temperature sensor (Steps S-9, S-10), the controller 172 preferably activates an exhaust gas temperature warning (Step S-11). The exhaust gas temperature warning can include operating lights, gauges, buzzers and/or other alarm features such as those described above.

While activating the exhaust gas temperature warning, the controller 172 also can begin reducing the engine speed into a "limp home" mode with the ignition control system (Step S12). By reducing engine speed, the operating temperature of the engine can also be reduced. Hence, much of the harm that can be caused to the engine and exhaust components by the high temperatures can be avoided. In addition, the controller 172 can output a signal requesting maintenance or repair of the engine. Following this repair and/or maintenance, the watercraft may be safely operated.

With reference now to FIG. 6A again, the exhaust pipe temperature warning subroutine will be described in more detail. The exhaust pipe temperature warning is designed to detect whether the exhaust pipe temperature sensor 156 is operational and whether the exhaust pipe temperature sensor 156 is detecting a failure of a coolant system such that the exhaust pipe temperature can increase above a preset level.

With reference now to FIG. 6A, following power up of the CDI unit, the controller 172 begins detecting and receiving input from the exhaust pipe temperature sensor 156 (Decision Block S13). Based upon the detected temperature, the controller 172 either investigates further or issues an alarm as shown in the illustrated flow diagram. In the event that the sensed temperature is less than a preset temperature T3, the controller 172 opens the starter sub-relay and disables the starter motor (Step S14). Thus, the starter motor cannot be used on subsequent engine restart attempts without resetting the sub-relay.

In the illustrated arrangement, the preset temperature T3 is sufficiently low (i.e., less than about −28° C.) that the controller determines that the exhaust pipe temperature sensor 156 cannot be operational and issues a second level alert (Step S15). During the second level alert, a constant buzzer may be sounded or a red light may be constantly lit and/or other increasing degrees of warning apparatus, methods and techniques may be employed.

The controller 172 then initiates a gradual engine stop (Step S16). The gradual engine stop is preferably performed by selectively disabling the ignition of one or more cylinders and progressively increasing the numbers of cylinders that are precluded from firing until the engine ceases to operate. Preferably, gradual engine stop is performed over a preset period of time. In the illustrated arrangement, the gradual engine stop takes about ten seconds from start to finish. Following the engine stop, maintenance repairs are advised and a reset button must be pressed to reset the starter sub-relay in the illustrated arrangement.

When the controller 172 samples the output of the exhaust pipe temperature sensor 156, the controller 172 can determine that the sensed temperature is greater than another preset temperature T2. For instance, the preset temperature T2 may be greater than 100° C. in some applications. Due to the elevated temperature, the controller 172 determines that the coolant system is not operating properly and the controller again activates the second level alert (Step S15) and the gradual engine stop (Step S16) described above. Moreover, the controller 172 opens the relay to disable the starter motor (Step S14) such that the engine cannot be restarted after the gradual engine stoppage.

With reference now to FIG. 6B, in the event the temperature being sensed by the exhaust pipe temperature sensor 156 is not below the first preset temperature T3 nor above the second preset temperature T2 (i.e., between −28° C. and 100° C.), controller 172 evaluates certain operational characteristics of the engine. For instance, in the illustrated arrangement, the engine speed is detected with an engine speed sensor, the coolant temperature is detected, and the timer is operated. More specifically, the timer is operated once the engine speed exceeds a preset speed and the exhaust temperature also exceeds a third predetermined temperature (Decision Block S17). In one arrangement, if the engine speed exceeds 7,000 rpm and the temperature exceeds 300° C. for more than approximately five seconds, the controller 172 initiates the second level alert and gradually stops the engine (Steps S15, S16). In some arrangements, the starter sub-relay also is opened.

If these conditions are not met, the controller 172 again checks the exhaust pipe temperature. If this temperature is less than a fourth preset temperature T1, then the controller 172 starts the sub-routine over again by returning to the beginning of the sub-routine in the illustrated arrangement. For instance, if the exhaust pipe temperature is less than about 95° C. in the illustrated arrangement, then the watercraft exhaust cooling system is properly operational and the routine begins again.

If the temperature sensed by the exhaust pipe temperature sensor 156 is less than the first preset temperature T3 (i.e., the sensor is not operational), the second level alert is activated and the engine is gradually stopped (Steps S15, S16).

If the temperature exceeds the second preset temperature T2, then the controller 172 detects if the temperature is exceeding this high temperature for longer than a preset period. For instance, in the illustrated arrangement, if the temperature exceeds approximately 100° C. for more than about two seconds, then a second level alert is initiated and the engine is gradually stopped (see Step S18). If the sensed temperature is greater than the third preset temperature T1, (i.e., the normal operational temperature of the exhaust cooling system), yet less than the second preset temperature T2 (i.e., the temperature that causes the alert in step S18, S14), the controller determines whether this condition has been existing for more than a preset period of time (Decision Block S20). In the illustrated arrangement, the preset period of time is approximately one second. If the duration does not exceed one second, then the routine begins again. However, if the duration does exceed about one second, a first level alert is initiated (Step S21). The first level alert preferably includes lighting amber lights, lighting intermittent lights, activating intermittent buzzers, and/or any other lower intensity alerting strategy. When the first level alert is initiated (Step S21), the engine speed also is reduced (Step S22) through misfiring or any other suitable engine speed control routine. In addition, a notice to request maintenance or repair is issued. This intervening temperature level, which occurs between a normal operating temperature and an excessive operating temperature, desirably indicates that the amount of coolant flowing through the cooling system is reduced and that the cooling system is likely at least partially occluded.

The above-described subroutines allow an operator of the watercraft to know if the cooling system or the associated sensors has been compromised. In addition, the routine allows an operator to understand whether the sensed malfunction is a minor event or a major event and the controller automatically takes precautionary action accordingly. In the event of a minor event, the engine speed is reduced and the operator is warned. In the event of a major event, the engine is disabled and the starter motor is temporarily disabled. This ensures that the operator does not think the engine is simply fouling and does not attempt to restart the engine unaware of any potential cooling system problems.

Of course, the foregoing description is that of certain features, aspects and advantages of the present invention to which various changes and modifications may be made without departing from the spirit and scope of the present invention. For instance, the starter motor can be disabled for a preset period of time (i.e., the sub-relay is automatically reset after a preset period of time). Moreover, a control system need not feature all objects of the present invention to use certain features, aspects and advantages of the present invention. For instance, various portions of the routines and sub-routines can be used without other portions and can be reordered or rearranged. The present invention, therefore, should only be defined by the appended claims.

What is claimed is:

1. An exhaust temperature control system for an engine having an exhaust system that is cooled by an exhaust cooling system, the control system comprising a coolant sensor adapted to sense an operational condition of the exhaust cooling system, a controller being electrically connected to said coolant temperature sensor, said controller receiving an input signal from said coolant temperature sensor indicative of an operating condition of said exhaust cooling system, said controller also being controllably connected to a switchable relay, said relay being adapted to interrupt a power supply to a starter motor, said controller interrupting said power supply to said starter motor when said input signal indicates a malfunction in the exhaust cooling system.

2. The control system of claim 1 further comprising a gas temperature sensor being electrically connected to said controller.

3. The control system of claim 2 further comprising at least one alert device, said at least one alert device being operably connected to said controller, said controller receiving a signal indicative of an exhaust gas temperature and said controller activating said alert device when said signal is lower than a preset temperature, thereby indicating that said gas temperature sensor is disabled.

4. The control system of claim 3 further comprising an engine speed sensor that communicates with said control, said control further comprising a clock and said alert activation being delayed until an engine speed sensed by said engine speed sensor is greater than a preset speed for a duration longer than a preset time period as determined by said clock.

5. The control system of claim 2, wherein said controller receives a signal from said gas temperature sensor that is indicative of an exhaust gas temperature and said controller slows the engine when said signal indicates that said gas temperature is lower than a preset temperature, thereby indicating that said gas temperature sensor is disabled.

6. The control system of claim 2 further comprising at least one alert device, said at least one alert device being operably connected to said controller, said controller receiving a signal indicative of an exhaust gas temperature and said controller activating said alert device when said signal indicates that said gas temperature has exceeded a preset temperature.

7. The control system of claim 2, wherein said controller receives a signal from said gas temperature sensor that is indicative of an exhaust gas temperature and said controller slows the engine when said signal indicates that said gas temperature has exceeded a preset temperature.

8. The control system of claim 1, wherein said input signal comprises a signal from said coolant sensor that is indicative of a coolant temperature and said signal indicates a malfunction if said signal is lower than a first preset temperature which indicates that the coolant sensor is not operational.

9. The control system of claim 1, wherein said input signal comprises a signal from said coolant sensor that is indicative of a coolant temperature and said signal indicates a malfunction if said signal is higher than a second preset temperature that indicates that the coolant flow through said exhaust cooling system is at least partially obstructed.

10. The control system of claim 1 further comprising an engine speed sensor that communicates with said control, said control further comprising a clock, said input signal comprising a signal from said coolant sensor that is indicative of a coolant temperature, said signal indicating a malfunction if, after the engine has exceeded a preset speed for longer than a preset period of time without said signal exceeding a first preset temperature, said signal exceeds a second preset temperature for more than a second preset period of time, said first preset temperature being higher than said second preset temperature.

11. A method of alerting an operator of a water vehicle to a malfunction in an exhaust cooling system, the method comprising sensing a temperature of coolant cooling an exhaust system, comparing said sensed temperature to a preset temperature, activating an alarm if said sensed temperature is less than said preset temperature and disabling a starter motor if said sensed temperature is less than said preset temperature.

12. The method of claim 11, wherein said starter motor is disabled for a predetermined length of time.

13. The method of claim 11, wherein said starter motor is disabled until manually reset.

14. The method of claim 11, wherein the alarm comprises audible alerts.

15. The method of claim 11, wherein the alarm comprises visual alerts.

16. The method of claim 11, wherein the alarm comprises tactile alerts.

17. A method of alerting an operator of a water vehicle to a malfunction in an exhaust cooling system, the method comprising sensing a temperature of coolant cooling an exhaust system, comparing said sensed temperature to a preset temperature, and activating an alarm if said sensed temperature is less than said preset temperature and gradually stopping said engine.

18. The method of claim 17, wherein gradually stopping said engine comprises selectively misfiring cylinders and increasing the number of misfires over time.

19. A method of alerting an operator of a water vehicle to a malfunction in an exhaust cooling system, the method comprising sensing a temperature of exhaust gases passing through an exhaust system, comparing said sensed temperature to a preset temperature, activating an alarm if said sensed temperature is less than said preset temperature, and delaying any alarm until said engine speed has exceed a preset speed for a predetermined period of time.

20. The method of claim 19 further comprising reducing the speed of the engine if said sensed temperature is less than said preset temperature.

21. A method of alerting an operator of a water vehicle to a malfunction in an exhaust cooling system, the method comprising sensing a coolant temperature of an exhaust cooling system before ignition of an engine, comparing said sensed temperature to a first preset temperature, activating an alarm if said sensed temperature is more than said first preset temperature and disabling a starter motor if said sensed temperature is more than said first preset temperature.

22. The method of claim 21, wherein said starter motor is disabled for a predetermined length of time.

23. The method of claim 21, wherein said starter motor is disabled until manually reset.

24. The method of claim 21 further comprising gradually stopping said engine.

25. The method of claim 24, wherein gradually stopping said engine comprises selectively misfiring cylinders and increasing the number of misfires over time.

26. The method of claim 21, wherein the alarm comprises audible alerts.

27. The method of claim 21, wherein the alarm comprises visual alerts.

28. The method of claim 21, wherein the alarm comprises tactile alerts.

29. A method of alerting an operator of a water vehicle to a malfunction in an exhaust cooling system, the method comprising sensing a coolant temperature of an exhaust cooling system before ignition of an engine, comparing said sensed temperature to a first preset temperature, activating an alarm if said sensed temperature is more than said first preset temperature and continuing to sense a coolant temperature if said sensed temperature is less than said first preset temperature, sensing an engine speed, comparing said sensed engine speed to a preset engine speed and waiting until said sensed engine speed has exceeded said preset engine speed for a first preset period of time then comparing said sensed temperature to said first preset temperature, and activating said alarm if said sensed temperature is more than said first preset temperature.

30. The method of claim 29 further comprising comparing said sensed temperature to a preset low temperature and to a preset high temperature and delaying said alarm until after said temperature has exceeded said preset high temperature for a third preset period of time.

31. The method of claim 30 further comprising gradually stopping said engine.

32. The method of claim 31, wherein gradually stopping said engine comprises selectively misfiring cylinders and increasing the number of misfires over time.

33. The method of claim 29 further comprising comparing said sensed temperature to a preset low temperature and to a preset high temperature, sensing an engine speed, comparing said engine speed to a preset engine speed and delaying said alarm until after said sensed temperature has exceeded said first preset temperature for a second preset period of time if said sensed temperature is above said preset low temperature and is below said preset high temperature but is above said first preset temperature.

34. The method of claim 33 further comprising slowing the engine speed if said sensed temperature is above said first preset temperature.

35. The method of claim 34, wherein said slowing said engine comprises selectively misfiring cylinders.

* * * * *